UNITED STATES PATENT OFFICE.

JOHN S. ROGERS, OF GLOUCESTER, MASSACHUSETTS.

PROCESS OF EXTRACTING GELATINE OR ICHTHYOCOLLA FROM SALTED FISH-SKINS.

SPECIFICATION forming part of Reissued Letters Patent No. 9,226, dated June 1, 1880.

Original No. 167,123, dated August 24, 1875. Application for reissue filed February 18, 1878.

*To all whom it may concern:*

Be it known that I, JOHN S. ROGERS, of Gloucester, of the county of Essex and State of Massachusetts, have invented a new and useful Process of Extracting Gelatine or Ichthyocolla from Salted Fish-Skins; and I do hereby declare the same to be fully described in the following specification.

In the preparation of what is termed "salt fish" for the market, it is now customary, after the fish—whether it be cod, hake, or cusk—has been salted and dried, to strip the skin from the flesh and skeleton, and, after removal of the bones, to cut the flesh into suitable pieces, and pack such in boxes for preservation or sale. The skins so stripped off, by reason of being very thoroughly impregnated with salt, or chloride of sodium, have been of little or no value. They could not be used for manure to advantage on account of the salt in them, and therefore have been considered as so much waste matter.

The purpose of my invention is to utilize such salted skins of fish, and in carrying it out the first portion of the process is to desalt and descale the skins. This I accomplish by soaking the skins in cool water, and agitating them sufficiently to remove the salt and the scales. The water should be changed repeatedly until the salt and the scales may have been thoroughly separated from the skins. After this the skins are to be put into fresh water, which should be gradually heated up to a boiling temperature, which should be continued for three hours, more or less, until the gelatine may have been sufficiently extracted. Next, the superfluous matter should be removed, and the liquid containing the gelatine should be strained or filtered, so as to obtain the gelatinous solution in a purified state. Next, the liquid gelatine is to be run into pans or molds, or upon slabs, and exposed to the atmosphere, so as to become desiccated and sufficiently hard for use, whether as an article of food or as a glue for mechanical purposes.

I claim as my invention—

The process of obtaining isinglass or gelatine from salted fish-skins—namely, by desalting and boiling them, straining off the liquid, and causing it to evaporate, for the purpose described.

JOHN S. ROGERS.

Witnesses:
R. H. EDDY,
JOHN R. SNOW.